US009351230B2

(12) United States Patent
Palin et al.

(10) Patent No.: US 9,351,230 B2
(45) Date of Patent: May 24, 2016

(54) DEVICE ACCESS

(71) Applicant: Nokia Corporation, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/517,985

(22) Filed: Oct. 20, 2014

(65) Prior Publication Data
US 2015/0119016 A1 Apr. 30, 2015

(30) Foreign Application Priority Data

Oct. 24, 2013 (EP) .................................. 13190053

(51) Int. Cl.
H04W 40/24 (2009.01)
H04W 8/00 (2009.01)
H04W 76/04 (2009.01)
H04W 24/02 (2009.01)
H04W 76/02 (2009.01)
H04M 1/725 (2006.01)
H04W 48/16 (2009.01)
H04W 84/18 (2009.01)

(52) U.S. Cl.
CPC ............ *H04W 40/246* (2013.01); *H04W 8/005* (2013.01); *H04W 24/02* (2013.01); *H04W 76/02* (2013.01); *H04W 76/046* (2013.01); *H04M 1/7253* (2013.01); *H04W 48/16* (2013.01); *H04W 84/18* (2013.01)

(58) Field of Classification Search
CPC . H04W 40/24; H04W 40/244; H04W 40/246; H04W 40/248; H04W 40/26; H04W 40/28; H04W 40/30; H04W 68/00

USPC ........................ 455/41.1, 41.2, 418, 419, 420
See application file for complete search history.

(56) References Cited

U.S. PATENT DOCUMENTS

| 5,852,630 | A | * | 12/1998 | Langberg | H04L 27/2647 375/219 |
|---|---|---|---|---|---|
| 7,675,537 | B2 | * | 3/2010 | Wilson | H04L 12/1813 348/14.01 |
| 2011/0021142 | A1 | * | 1/2011 | Desai | H04W 8/005 455/41.2 |
| 2012/0257561 | A1 | * | 10/2012 | Redding | H04L 12/1827 370/312 |
| 2012/0289158 | A1 | * | 11/2012 | Palin | H04W 8/005 455/41.2 |
| 2013/0109314 | A1 | * | 5/2013 | Kneckt | H04W 4/008 455/41.2 |
| 2014/0038607 | A1 | * | 2/2014 | Makharia | H04W 36/0011 455/436 |
| 2014/0355582 | A1 | * | 12/2014 | Kamath | H04W 84/20 370/338 |

* cited by examiner

*Primary Examiner* — Siu Lee
(74) *Attorney, Agent, or Firm* — Locke Lord LLP

(57) ABSTRACT

A technique for operating a wireless communication apparatus is provided. According to an example embodiment, the technique comprises operating a wireless communication apparatus in one of a plurality of states, said plurality of states comprising at least a discoverable state wherein the wireless communication apparatus is discoverable but not connectable and a connectable state wherein the wireless communication apparatus is both discoverable and connectable, receiving, when operating the wireless communication apparatus in the discoverable state, one or more requests from a remote wireless communication apparatus, and changing from the discoverable state to the connectable state in response to said requests fulfilling predefined criteria.

18 Claims, 5 Drawing Sheets

100

DEVICE ACCESS

TECHNICAL FIELD

The example and non-limiting embodiments of the present invention relate to device discovery and device selection for a short-range wireless communication.

BACKGROUND

Establishing a wireless connection between two devices, including e.g. steps of device discovery, device selection and connection setup are in many occasions complicated operations. Multitude of different communication techniques and protocols may make it uncomfortable or even difficult for a user of a device to successfully perform these operations.

SUMMARY

According to an example embodiment, an apparatus is provided, the apparatus comprising at least one processor and at least one memory including computer program code for one or more programs, the at least one memory and the computer program code configured to, with the at least one processor, cause the apparatus at least to operate in one of a plurality of states, said plurality of states comprising at least a discoverable state wherein the wireless communication apparatus is discoverable but not connectable and a connectable state wherein the wireless communication apparatus is both discoverable and connectable, to receive, when being operated in the discoverable state, one or more requests from a remote wireless communication apparatus, and to change from the discoverable state to the connectable state in response to said requests fulfilling predefined criteria.

According to another example embodiment, a method is provided, the method comprising operating a wireless communication apparatus in one of a plurality of states, said plurality of states comprising at least a discoverable state wherein the wireless communication apparatus is discoverable but not connectable and a connectable state wherein the wireless communication apparatus is both discoverable and connectable, receiving, when operating the wireless communication apparatus in the discoverable state, one or more requests from a remote wireless communication apparatus, and changing from the discoverable state to the connectable state in response to said requests fulfilling predefined criteria.

According to another example embodiment, a computer program is provided, the computer program including one or more sequences of one or more instructions which, when executed by one or more processors, cause a wireless communication apparatus at least to operate in one of a plurality of states, said plurality of states comprising at least a discoverable state wherein the wireless communication apparatus is discoverable but not connectable and a connectable state wherein the wireless communication apparatus is both discoverable and connectable, to receive, when being operated in the discoverable state, one or more requests from a remote wireless communication apparatus, and to change from the discoverable state to the connectable state in response to said requests fulfilling predefined criteria.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

So-called touch-to-select (T2S) technique has been developed to facilitate a user-friendly approach for establishing the wireless connection between two devices. In the T2S technique, a first device (a touching device) is brought to a close proximity of a second device (a touched device), and, consequently, an automatic device discovery, device selection and connection setup between the touching device and the touched device follows. The T2S technique involves applying, in the touching device, a measure indicative of the strength of a signal originating from the touched device as an indication of the touched device being within a range that is considered suitable for establishing a wireless connection between the touching and touched devices.

In the T2S technique, the device discovery, i.e. the touching device discovering the presence of the touched device, is based on the touched device (or, typically, a to-be-touched device, to be precise) transmitting packet(s) according to used communication protocol that the touching device receives. The touching device is hence able to recognize a touchable device on basis of information received in the packet(s).

Figure 1:
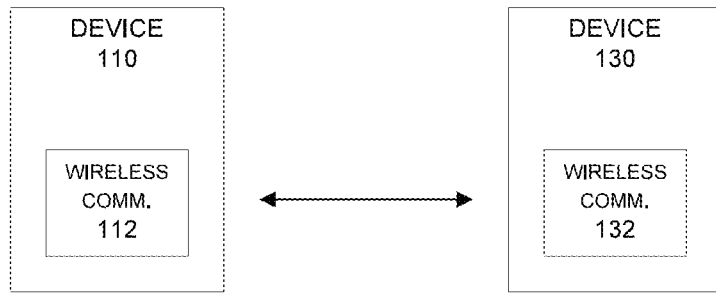
FIG. 1 schematically illustrates some components of a wireless communication arrangement and devices according to an example embodiment.

FIG. 1 schematically illustrates some components or entities of a wireless communication arrangement 100 to depict an exemplifying use case for various embodiments of the present invention, for example within the framework of the T2S technique outlined hereinbefore. The communication arrangement includes a first device 110 and a second device 130. The first device 110 may also be referred to as a scanning device, a discovering device or a touching device, and these terms are interchangeably used in the following. Similarly, the second device 130 may also be referred to as an advertising device, a discovered device, a touched device or a to-be-touched device, and these terms are interchangeably used in the following. Moreover, the first device 110 may also be referred to as a first apparatus 130 while the second device 130 may also be referred to as a second apparatus 130.

The first device 110 is, preferably, a mobile device. The first device 110 comprises a wireless communication portion 112 for communicating with other devices using a short-range wireless communication technique or protocol for a point-to-point or point-to-multipoint connection. The first device 110 is hence capable of communicating with other devices equipped with means for wireless communication using the same technique/protocol. The wireless communication portion 112 may be considered as a wireless communication apparatus included in (or hosted by) the first device 110 (or the first apparatus 110).

The second device 130 may be a mobile device or a fixed device. The second device 130 comprises a wireless communication portion 132 similar to the wireless communication portion 112, thereby enabling the short-range wireless communication between the first device 110 and the second device 130. Along the lines described for the wireless communication portion 112, the wireless communication portion 132 may be considered as a wireless communication apparatus included in (or hosted by) the second device 130 (or the second apparatus 130).

Each of the wireless communication portions 112, 132 may be provided e.g. as a respective chipset and/or as a respective communication module. For clarity and brevity of description, each of the wireless communication portions 112, 132 is described as a single logical portion that is also able to process the information received via the wireless connection and/or that is to be transmitted via the wireless connection. However, in a real-life embodiment each of the wireless communication portions 112, 132 may comprise e.g. a wireless transceiver portion for wireless communication and a control portion for processing information received/transmitted vie the wireless transceiver portion. Such a control portion may be provided by hardware means, by software means or by combination of hardware means and software means. The communication portion 112, 132 may further comprise e.g. a memory for storing information and an interface to other components or entities of the respective device 110, 130. As an example, the control portion may be provided e.g. as a processor and the memory may include a computer program code, and the memory and the computer program code may be configured to, with the processor, control operation of the respective wireless communication portion 112, 132.

Each of the first and second device 110, 130 may comprise further portions or components, such as a user interface for receiving input from the user and for providing feedback to the user, a memory for storing data and program code, a processor for controlling the operation of the device 110, 130 e.g. in accordance with the program code stored in the memory, in accordance with the user input and/or in accordance with information received from wireless communication portions 112, 132, further communication portions for providing wireless or wireline communication using technique(s)/protocol(s) different from that employed by the wireless communication portions 112, 132, etc. The memory and the program code of the device 110, 130 may be further arranged to, with the processor of the device 110, 130, control operation of the respective wireless communication portion 112, 132, possibly together with the control portion that may be provided within the respective wireless communication portion 112, 132.

While a number of short-range wireless communication techniques/protocols are known in the art, in the following, some aspects of various embodiments of the present invention are described with references to the Bluetooth Low Energy (BT LE) protocol. However, the BT LE serves as an illustrative and non-limiting example in this regard, and the description generalizes into any wireless communication protocol where the first device 110 and the second device 130 establish a wireless connection therebetween on basis of the second device 130 advertising its presence to the first device 110 and to other scanning devices, as will be described in the following in more detail.

BT LE operates in the unlicensed 2.4 GHz ISM band, in the same manner as does the Bluetooth Basic Rate/Enhanced Data Rate (BR/EDR). BT LE supports data packets from 8 octets to a maximum of 27 octets, thereby providing a low duty cycle. BT LE employs a frequency hopping transceiver with many frequency hopping spread spectrum (FHSS) carriers, with a bit rate of 1 Megabit per second (Mb/s).

BT LE is designed for applications requiring lower data rates and shorter duty cycles, with a very-low power idle mode, a simple device discovery, and short data packets. BT LE protocol allows a star network topology in connections, where one device may serve as a master for a plurality of slave devices. The master device dictates the connection timing and communication operations of the one or more slave devices. BT LE communicates over a total of 40 RF channels, separated by 2 MHz. Data communication between BT LE devices occurs in 37 pre-specified data channels of the 40 RF channels. All data connection transmissions occur in connection events wherein a point-to-point connection is established between the master device and a slave device. In the BT LE protocol, a slave device may provide data through BT LE communication to the master device to which it is connected and vice versa. The remaining 3 channels of the 40 RF channels are advertising channels used by devices to advertise their existence and capabilities. The BT LE protocol defines a unidirectional connectionless broadcast mode on the advertising channels. A TDMA based polling scheme is used in which one device transmits a packet at a predetermined time and a corresponding device responds with a packet after a predetermined interval.

The physical channel is sub-divided into time units known as events. Data is transmitted between BT LE devices in packets that are positioned in these events. There are two types of events: Advertising events and Connection events. Devices that transmit advertising packets on the advertising Physical Layer (PHY) channels are referred to as advertisers or advertising devices. Devices that receive advertising on the advertising channels without an immediate intention to connect to the advertising device are referred to as scanners or scanning devices. Devices that form a connection to another device by listening for connectable advertising packets are referred to as initiators or initiator devices. Transmissions on the advertising PHY channels occur in advertising events. At the start of each advertising event, the advertiser sends an advertising packet corresponding to an advertising event type.

The scanning device, which may be also referred to as the initiator device, that receives the advertising packet, may make a connect request (CONNECT_REQ) to the advertising device on the same advertising PHY channel. The advertising device accepting the CONNECT_REQ request results in establishing a point-to-point connection between the scanning/initiator device and the advertising device. The scanning/initiator device becomes a master device while the advertising device that becomes a slave device in a piconet. The master and the slave devices know at what time and in which frequency the connection is in operation. The data channel changes between every connection event and the start of connection events are spaced regularly with the connection interval that is provided in the CONNECT_REQ packet and that may be updated using a LL_CONNECTION_UPDATE_REQ packet.

As an overview of a communication session between the first device 110 and the second device 130, e.g. between the communication portions 112 and 132, device discovery, device selection, connection setup and the information exchange may comprise, for example, the following steps (not necessarily listed in order of their occurrence):
the first device 110 scanning for advertising devices;
the second device 130 advertising its presence;
the first device 110 transmitting a scan request to the second device 130;
the second device 130 responding to the scan request from the first device 110;
the first device 110 sending a connection request to the second device 130;
the first device 110 and the second device 130 establishing a connection therebetween;
the first device 110 and the second device 130 exchanging information therebetween (in either one of the directions or in both directions); and
after completion of the information exchange, the first device 110 or the second device 130 closing the connection.

In the following, some of these conceptual steps are described in more detail in an exemplifying and non-limiting manner.

Within the framework of the wireless communication arrangement 100, the connection between the scanning device 110 and the advertising device 130 may be established by bringing the scanning device 110 within a close proximity of the advertising device 130. The wireless communication portion 112 of the scanning device 110 detects the presence of the advertising device 130 on basis of one or more advertising events transmitted by the wireless communication portion 132 of the advertising device 130. On the other hand, the wireless communication portion 132 of the advertising device 130 detects the presence of the scanning device 110 on basis of one or more requests transmitted by the wireless communication portion 112 of the scanning device 110. Without losing generality, in the following such requests are referred to as scan requests. The wireless communication portion 112 may be configured to determine whether the advertising device 130 is within an operating range and to respond to the advertising event(s) only in case the advertising device 130 is determined to be within the operating range. The operating range may be considered, for example, to represent a 'touching range', in other words a range where the scanning device 110 and the advertising device 130 are in or close to being in physical touch with each other. This may comprise the wireless communication portion 112 configured to extract one or more received signal strength indications (RSSI) on basis of the received advertising events and to respond to the advertising event(s) only in response to the RSSI(s) or an RSSI value derived therefrom meeting predefined criteria. In other words, the RSSI(s) or the RSSI value may be considered to serve as an indication of the distance to the advertising device 130.

In this regard, the wireless communication portion 112 may be configured to derive an RSSI value $RSSI_A$ that is descriptive of the distance to the advertising device 130. The $RSSI_A$ may be derived on basis of advertising events received from the advertising device 130 e.g. as the RSSI of the most recently received advertising event, as the RSSI of any single advertising event received within a predefined time window, as the lowest RSSI of the advertising events received within the predefined time window, as the average of the RSSI of the advertising events received within the predefined time window, as the lowest RSSI among a predetermined number of the most recently received advertising events, as the average RSSI of the predetermined number of the most recently received advertising events, etc. The wireless communication portion 112 may be configured, for example, to consider the advertising device 130 to be within the operating range in response to the $RSSI_A$ exceeding a predetermined threshold $Th_A$. Consequently, the wireless communication portion 112 may be configured to respond to the advertising events in response to the $RSSI_A$ exceeding the threshold $Th_A$, i.e. when $RSSI_A > Th_A$. In contrast, the wireless communication portion 112 may be configured to consider the advertising device 130 to be outside the operating range and, therefore, to refrain from responding in case the $RSSI_A$ fails to exceed the threshold $Th_A$.

As another example, the wireless communication portion 112 may be configured to compare the RSSI(s) extracted or derived for a single advertising event to the predetermined threshold $Th_A$. In this regard, the wireless communication portion 112 may be configured to consider the advertising device 130 to be within the operating range in response to the RSSI(s) of at least a predetermined number $N_A$ of advertising events from the wireless communication portion 132 exceeding the threshold $Th_A$ and/or to consider the advertising device 130 to be outside the operating range in response to the number of advertising events that have an RSSI exceeding the threshold $Th_A$ failing to reach at least the predetermined number $N_A$. In this regard, the wireless communication portion 112 may be arranged e.g. to consider the number of consecutive advertising events and/or to consider the number of advertising events received within a predefined time period. The predetermined number $N_A$ may be a value chosen from the range 1 to 10, for example two. Consequently, the wireless communication portion 112 may be configured to respond to the advertising event(s) in response to considering the advertising device 130 to be within the operating range (e.g. in response to the RSSI(s) of at least the predetermined number $N_A$ of advertising events exceeding the threshold $Th_A$) and/or to refrain from responding in response to considering the advertising device 130 to be outside the operating range (e.g. in response to the number of advertising events having an RSSI that exceeds the threshold $Th_A$ failing to reach at least the predetermined number $N_A$).

Employing the threshold $Th_A$ along the lines described hereinbefore e.g. facilitates avoiding the wireless communication portion 112 consuming operating power for connection attempts that are likely to fail or to result in a low connection quality due to high distance to the advertising device 130.

The wireless communication portion 132 may be operated in one of a plurality of states that comprise at least a state where the wireless communication portion 132 is discoverable by other devices (or communication portions thereof) but not connectable and a state where the wireless communication portion is both discoverable by other devices and also connectable by the other devices. For clarity and brevity of description, the former state is referred to as a discoverable state and the latter state is referred to as a connectable state.

The wireless communication portion 132 may be configured to change from the discoverable state to the connectable state in response to receiving one or more scan requests from a remote wireless communication portion, e.g. from the wireless communication portion 112 of the first device 110 and further in response to these scan requests fulfilling predefined criteria. As an example regarding the criteria, the wireless communication portion 132 may be configured to allow connection attempts by only those scanning devices that are in a close enough proximity to the advertising device 130, e.g. connection attempts from scanning devices that are within the operating range (e.g. the 'touching range' described hereinbefore). Alternatively or additionally, as another example, the wireless communication portion 132 may be configured to allow connection attempts by scanning devices for which an identity matching one of one or more predetermined identities is indicated.

In the discoverable state the wireless communication portion 132 may be advertising its presence to the other devices but the wireless communication portion 132 is not freely connectable by the scanning device 110 (and/or by any further scanning devices). As an example in this regard, the wireless communication portion 132 may be configured to transmit indications that indicate the wireless communication portion to be operated in the discoverable state. Within the BT LE framework such an indication may comprise a scannable undirected advertising (ADV_SCAN_IND) event. The wireless communication portion 132 is typically arranged to transmit such indications according to a predefined pattern, e.g. at predetermined time intervals.

Consequently, upon receiving one or more indications that indicate presence of the advertising device 130 operating in the discoverable state (e.g. ADV_SCAN_IND events), the wireless communication portion 112 may be configured to respond to the indications(s) by transmitting one or more scan requests addressed to the wireless communication portion 132. The wireless communication portion 112 may be configured to respond by transmitting such request(s) only in case the RSSI(s) derived on basis of one or more of the received indications indicating the discoverable state meet the predefined criteria. An example of using an RSSI-based measure to screen connection attempts in the wireless communication portion 112 of the scanning device 110 is provided hereinbefore. Within the BT LE framework such a scan request may comprise a SCAN_REQ event.

The scan request may comprise or be accompanied by an identity indication that identifies the scanning device 110 and/or the wireless communication portion 112. The identity indication may comprise e.g. an address or other identifier associated with the scanning device 110 and/or with the wireless communication portion 112. In the BT LE framework the identity/address may comprise the BT address of the wireless communication portion 112. In general, the identity indication may comprise another address associated with the scanning device 110 and/or the wireless communication portion 112 (e.g. a network (IP) address, an email address, etc.), a name assigned to the scanning device 110 and/or the wireless communication portion 112, a telephone number or a user account associated with the scanning device 110 and/or the wireless communication portion 112, etc. As a further example, the identity indication may comprise an identifier that may be mapped into the identity or address of the scanning device 110 and/or the wireless communication portion 112 by using a predetermined rule.

In order to facilitate allowing connection attempts only from devices that are in close (enough) proximity to the advertising device 130, when operating in the discoverable state the wireless communication portion 132 may be configured to determine whether the scanning device 110 is within the operating range (e.g. the 'touching range) from the advertising device 130. This may comprise the wireless communication portion 132 configured to extract one or more RSSIs on basis of the scan requests received from the wireless communication portion 112. Moreover, the wireless communication portion 132 may be configured to change from the discoverable state into the connectable state in response to the RSSI(s) meeting predefined criteria.

The criteria in this regard may be similar to that described in context of the scanning device 110, e.g. the wireless communication portion 132 may be configured to derive an RSSI value $RSSI_S$ that is descriptive of the distance to the scanning device 110 and to allow connections in response to the $RSSI_S$ indicating the scanning device to be within an operating range that is considered to enable connection between the wireless communication portions 112 and 132. In this regard, the wireless communication portion 132 may be configured to consider the scanning device 110 to be within the operating range (e.g. the 'touching range') and to allow connection in response to the $RSSI_S$ exceeding a predetermined threshold $Th_S$, i.e. when $RSSI_S > Th_S$, and/or to consider the scanning device 110 to be outside the operating range and hence to refrain from allowing the connection in case the $RSSI_S$ fails to exceed the threshold $Th_S$.

The $RSSI_S$ may be derived on basis of the scan requests received from the scanning device 110 along similar lines as described hereinbefore for the $RSSI_A$, e.g. as the RSSI of the most recently received scan request, as the RSSI of any single scan request received within a predefined time window, as the lowest RSSI of the scan request received within the predefined time window, as the average of the RSSI of the scan requests received within the predefined time window, as the lowest RSSI among a predetermined number of the most recently received scan requests, as the average RSSI of the predetermined number of the most recently received scan requests, etc.

As another example, the wireless communication portion 132 may be configured to compare the RSSI(s) extracted/derived for individual scan requests originating from the wireless communication portion 112 to the predetermined threshold $Th_S$ and to consider the scanning device 110 to be within the operating range in response to the RSSI(s) of at least a predetermined number $N_S$ of scan requests exceeding the threshold $Th_S$ and/or to consider the scanning device 110 to be outside the operating range in response to the number of scan requests that have an RSSI exceeding the threshold $Th_S$ failing to reach at least the predetermined number $N_S$. In this regard, the wireless communication portion 132 may be arranged e.g. to consider the number of consecutive scan requests and/or to consider the number of scan requests received within a predefined time period. The predetermined number $N_S$ may be a value chosen from the range 1 to 10, for example two. Consequently, the wireless communication portion 132 may be configured to allow connection in response to considering the scanning device 110 to be within the operating range (e.g. in response to the RSSI(s) of at least the predetermined number $N_S$ of scan requests exceeding the threshold $Th_S$) and/or to refrain from allowing the connection in response to considering the scanning device 110 to be outside the operating range (e.g. in response to the number of scan requests having an RSSI that exceeds the threshold $Th_S$ failing to reach at least the predetermined number $N_S$).

In response to finding the scanning device 110 to be within the operating range (e.g. the 'touching range'), e.g. in response to the extracted RSSI(s) meeting the predefined criteria, the wireless communication portion 132 may be changed to operate in a connectable state where the wireless communication portion 132 is connectable by the scanning device 110 (while the connectability by other scanning devices may be determined separately). In this regard, the wireless communication portion 132 may be configured to transmit an indication indicating the advertising device 130 to be connectable by the scanning device 110. Within the BT LE framework, such an indicator may comprise an ADV_DIRECT_IND event addressed to the scanning device 110 and/or the wireless communication portion 112.

Alternatively, the response to finding the scanning device 110 to be within the operating range (e.g. the 'touching range'), e.g. in response to the extracted RSSI(s) meeting the predefined criteria, may comprise the wireless communication portion 132 changed to operate in a connectable state where the wireless communication portion 132 is connectable by any scanning device. In this regard, the wireless communication portion 132 may be configured to transmit one or more indicators indicating the wireless communication portion 132 to be connectable by any scanning device. Within the BT LE framework, such indicator may comprise an ADV_IND event.

In contrast, in response to finding the scanning device 110 to be outside the operating range (e.g. the 'touching range'), e.g. in response to a failure to meet the RSSI-based criteria, the wireless communication portion 132 may be configured to continue operating in the discoverable state and, possibly, to continue transmitting indicators indicating the operation in the discoverable state (e.g. ADV_SCAN_IND events in the BT LE framework).

Figure 2:
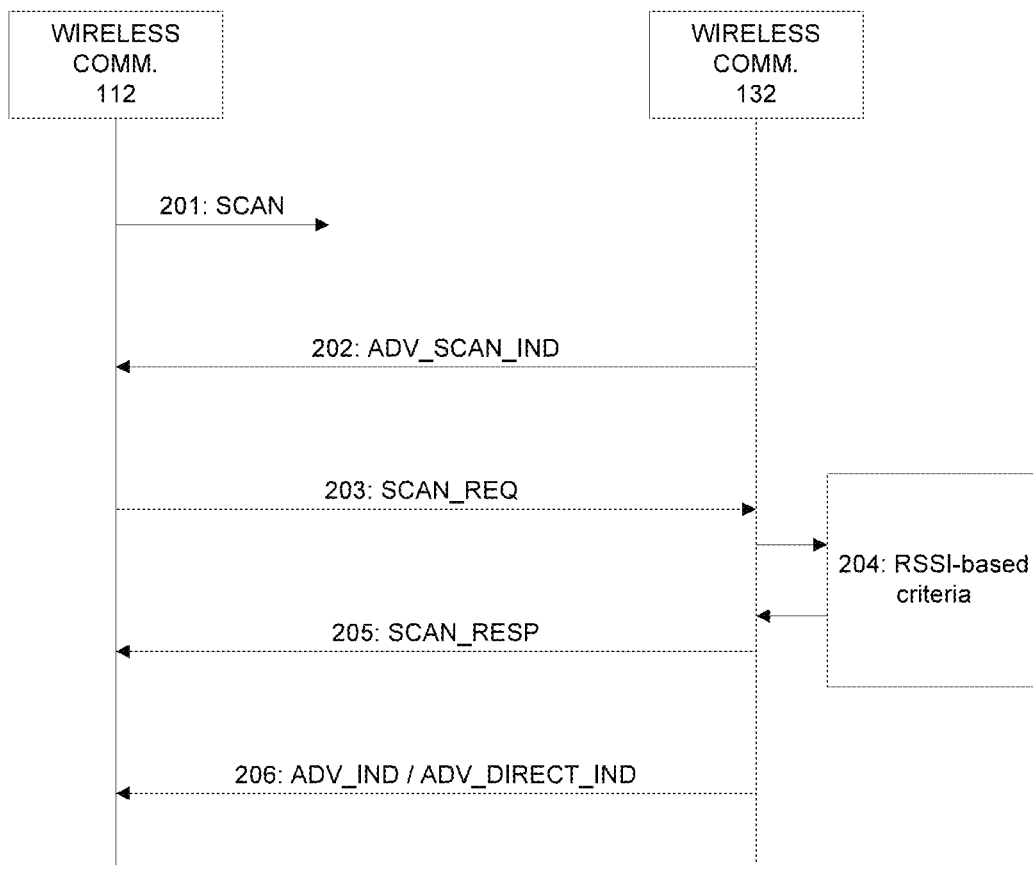
FIG. 2 illustrates device discovery and selection according to an example embodiment.

The device discovery and device selection described above is further illustrated within the BT LE framework by an exemplifying signaling chart of FIG. 2. In step 201 the wireless communication portion 112 carries out or initiates the scanning process. In step the 202 the wireless communication portion 132 operates in the discoverable state and transmits one or more ADV_SCAN_IND events. The wireless communication portion 112 receives at least some of the ADV_S-CAN_IND events and responds with one or more SCAN_REQ events addressed to wireless communication portion 132. In step 204 the wireless communication portion 132 evaluates the RSSI-based criteria described hereinbefore and case of the RSSI derived on basis of the SCAN_REQ events suggest the wireless communication portion 112 (and hence the scanning device 110) to be within an operating range, the wireless communication portion 132 changes into the connectable state. The wireless communication portion 132 may, optionally, send one or more SCAN_RESP events addressed to the wireless communication portion 112 to indicate that connection establishment is possible and/or that the wireless communication portion 132 is connectable, as shown in step 205. In step 206 the wireless communication portion 132 sends one or more ADV_DIRECT_IND or ADV_IND events to the wireless communication portion 112 (and hence to the first device 110) or to all wireless communication portions (and hence to all scanning devices) within reach, respectively, to indicate that it is connectable.

In case the RSSI-based criteria evaluated in step 204 suggests the wireless communication portion 112 (and hence the scanning device 110) to be outside the operating range, the (optional) SCAN_RESP message(s) of the step 205 may indicate that the connection establishment is not possible and/or that the wireless communication portion 132 is not connectable and, instead of transmitting the ADV_DIRECT_IND or the ADV_IND event(s) in step 206 the wireless communication portion 132 may continue transmitting the ADV_SCAN_IND events to indicate operation in the discoverable state.

Once the wireless communication portion 112 receives at least some of the ADV_DIRECT_IND or the ADV_IND events, it may initiate connection setup with the wireless communication portion 132 using procedures known in the art, and the process may continue with the information exchange between the first device 110 and the second device 130 via the wireless connection established between the wireless communication portions 112 and 132.

In order to facilitate allowing connection attempts only from devices or wireless communication portions for which a predetermined identity/address or one of the predetermined identities/addresses is indicated, the wireless communication portion 132 may be configured to compare the identity or address indicated for the first device 110 and/or for the wireless communication portion 112 to a set of allowable identities/addresses and to change from the discoverable state into the connectable state in response to this identity/address matching one of the allowable identities/addresses.

The wireless communication portion 132 may directly apply the identity indication received in or together with the scan requests as the identity/address of the scanning device 110 and/or the wireless communication portion 112. As another example, the wireless communication portion 132 may be configured to apply a predetermined mapping rule to convert the received identity indication into an identity/address to be used for verification of the identity/address of the scanning device 110 and/or the wireless communication portion 112. As an example, the identity indication may be received as a non-resolvable (BT LE) address and a mapping rule may be applied to convert the non-resolvable address into a 'real' address of the respective wireless communication portion 132 for use in the verification of identity.

Evaluating the identity/address-based criteria may include the wireless communication portion 132 consulting a database storing one or more identities/addresses for which the connections are allowable in an attempt to find an identity/address matching the one indicated for the first device 110 and/or the wireless communication portion 112. The database may be provided in the wireless communication portion or in another portion or entity of the second device 130 that is accessible by the wireless communication portion 132. Alternatively, the wireless communication portion 132 may be configured to send a query to another portion or entity of the second device 130, which is arranged to carry out the query in a database storing the allowable identities/addresses and to respond to the communication portion 132 whether an identity/address matching that indicated for the first device 110 and/or the wireless communication portion 112 was encountered.

The identities/addresses in the database may comprise a set of predetermined identities/addresses (defined e.g. during installation/configuration of the wireless communication portion 132 or the second device 130). Alternatively or additionally, the identities/addresses in the database may comprise identities/addresses determined on basis of past connections or communication sessions between the wireless communication portion 132 and remote devices, e.g. identities/addresses of the (wireless communication portions) of the remote devices with which the wireless communication portion 132 has communicated in the past. As a particular example of the latter type, the identities/addresses in the database may comprise identities/addresses corresponding to identity indications (to be) provided/received as non-resolvable (BT LE) addresses, agreed in a past pairing process between the wireless communication portion 132 and a remote device.

The wireless communication portion 132 is configured to change, in response to finding a matching identity/address in the database, to operate in the connectable state where the wireless communication portion 132 is connectable by the scanning device 110. Consequently, the wireless communication portion 132 may be configured to transmit an indicator indicating the advertising device 130 to be connectable by the scanning device 110. As described hereinbefore in context of the RSSI-based criteria, within the BT LE framework such an indicator may comprise an ADV_DIRECT_IND event addressed to the scanning device 110 and/or the wireless communication portion 112.

In contrast, in response to a failure to meet the identity/address-based criteria, the wireless communication portion 132 may be configured to continue operating in the discoverable state and, possibly, to continue transmitting the indicators indicating the operation in the discoverable state (e.g. the ADV_SCAN_IND events in the BT LE framework).

Figure 3:
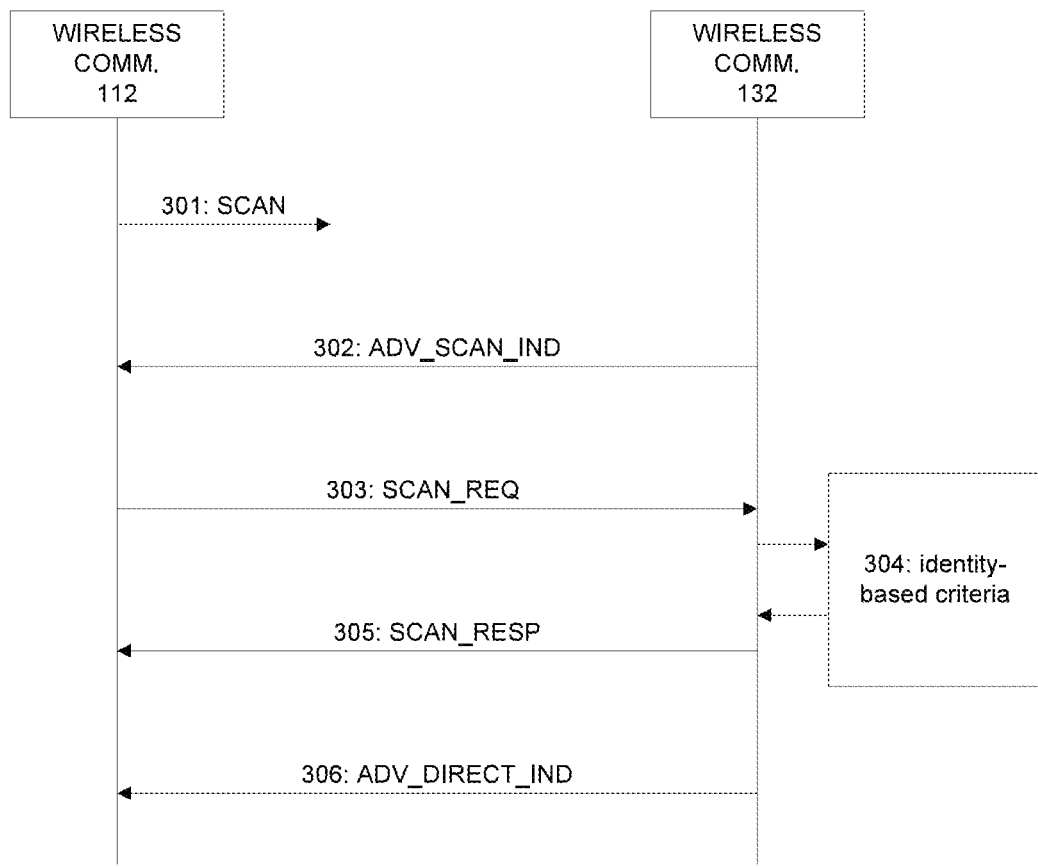
FIG. 3 illustrates device discovery and selection according to an example embodiment.

FIG. 3 provides another exemplifying signaling chart to further illustrate the device discovery and device selection described above within the BT LE framework. Steps 301 to 303 correspond to steps 201 to 203, respectively, described hereinbefore in context of the example illustrated by the signaling chart of FIG. 2. In step 304 the wireless communication portion 132 evaluates the identity/address-based criteria described hereinbefore and in case of the identity/address indicated for the first device 110 and/or the wireless communication portion 112 matches one of the one or more identities/addresses for which the connections are allowable, the wireless communication portion 132 changes into the connectable state. The wireless communication portion 132 may, optionally, send one or more SCAN_RESP events addressed to the wireless communication portion 112 to indicate that connection establishment is possible and/or that the wireless communication portion 132 is connectable, as shown in step 305. In step 306 the wireless communication portion 132 sends one or more ADV_DIRECT_IND events to the wireless communication portion 112 (and hence to the first device 110) to indicate that it is connectable.

In case the identity/address-based criteria evaluated in step 304 does not indicate any of the identities/addresses for which the connections are allowable, the (optional) SCAN_RESP message(s) of the step 305 may indicate that the connection establishment is not possible and/or that the wireless communication portion 132 is not connectable and, instead of transmitting the ADV_DIRECT_IND event(s) in step 306 the wireless communication portion 132 may continue transmitting the ADV_SCAN_IND events to indicate operation in the discoverable state.

Once the wireless communication portion 112 receives at least some of the ADV_DIRECT_IND events, it may initiate connection setup with the wireless communication portion 132 using procedures known in the art, and the process may continue with the information exchange between the first device 110 and the second device 130 via the wireless connection established between the wireless communication portions 112 and 132.

As a further alternative, the screening of the connection attempts from the scanning device 110 in the wireless communication portion 132 may involve both determining whether the scanning device 110 is within the operating range and determining whether the identity/address indicated therefor matches one of the predetermined identities/addresses. As an example, the screening may comprise applying both the RSSI-based criteria and the identity/address-based criteria described hereinbefore. In this regard, the wireless communication portion 132 may be configured to first evaluate the RSSI-based criteria, to evaluate the identity/address-based criteria in response to the $RSSI_S$ fulfilling the RSSI-based criteria, and to change operating in a connectable state in response to the identity indicated for the wireless communication portion 112 fulfilling the identity/address-based criteria.

As another example in this regard, the wireless communication portion 132 may be configured to first evaluate the identity/address-based criteria, to evaluate the RSSI-based criteria in response to the identity indicated for the wireless communication portion 112 fulfilling the identity/address-based criteria, and to change operating in a connectable state in response to the $RSSI_S$ fulfilling the RSSI-based criteria.

In both above examples involving application of both the RSSI-based criteria and the identity/address-based criteria, change to operate in the connectable state may further imply the wireless communication portion 132 transmitting one or more indicators indicating the connectable state. In contrast, a failure to meet either of the criteria may result in the wireless communication portion 132 (continuing) to transmit indicators indicating the discoverable state.

Figure 4:
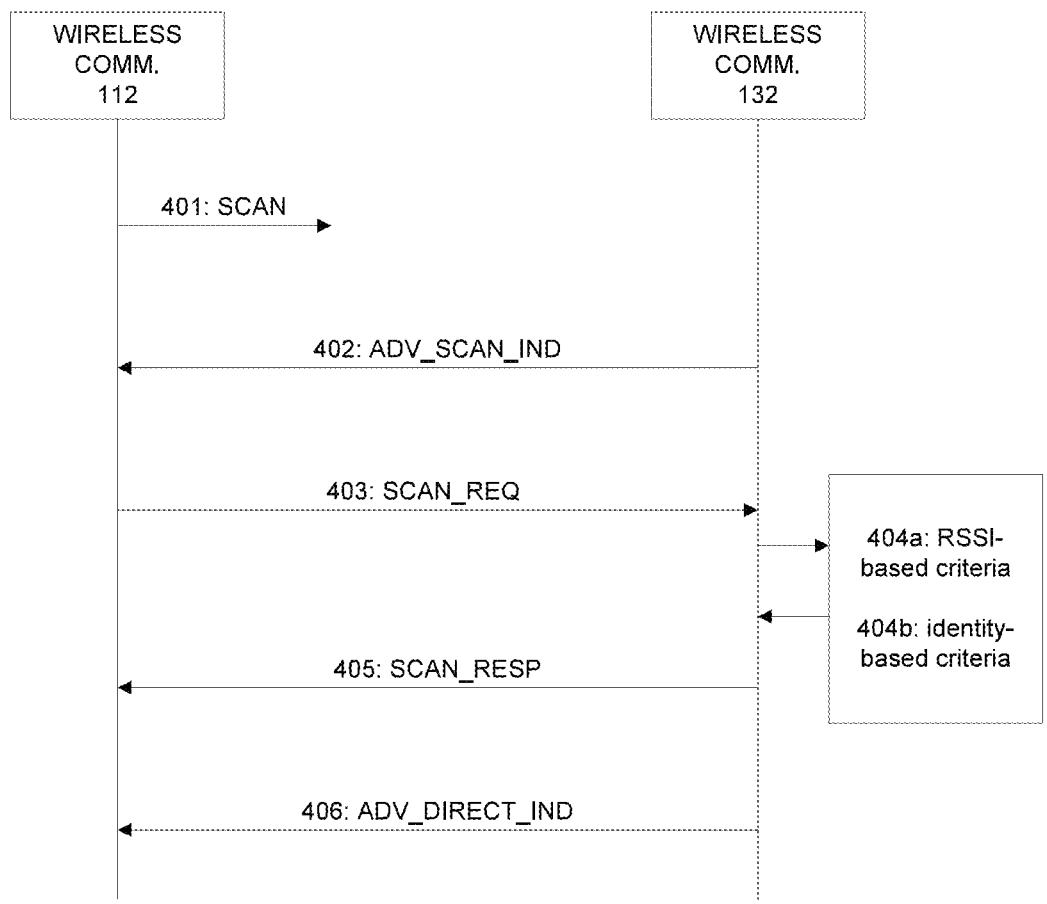
FIG. 4 device discovery and selection according to an example embodiment.

FIG. 4 provides a further exemplifying signaling chart to further illustrate the device discovery and device selection described above within the BT LE framework. Steps 401 to 403 correspond to steps 201 to 203, respectively, described hereinbefore in context of the example illustrated by the signaling chart of FIG. 2. In step 404a the wireless communication portion 132 evaluates the RSSI-based criteria described hereinbefore and case of the RSSI derived on basis of the SCAN_REQ events suggest the wireless communication portion 112 (and hence the scanning device 110) to be within an operating range, the process moves on to step 404b to evaluation of the identity/address-based criteria. In case also the identity/address indicated for the first device 110 and/or the wireless communication portion 112 matches one of the one or more identities/addresses for which the connections are allowable, the wireless communication portion 132 changes into the connectable state. The wireless communication portion 132 may, optionally, send one or more SCAN_RESP events addressed to the wireless communication portion 112 to indicate that connection establishment is possible and/or that the wireless communication portion 132 is connectable, as shown in step 405. In step 406 the wireless communication portion 132 sends one or more ADV_DIRECT_IND events to the wireless communication portion 112 (and hence to the first device 110) to indicate that it is connectable. As described hereinbefore, the order of evaluating the RSSI-based criteria and the identity/address-based criteria (i.e. the order of steps 404a and 404b) may be reversed.

In case of a failure to meet either of the RSSI-based criteria and the identity/address-based criteria in steps 404a and/or 404b, the (optional) SCAN_RESP message(s) of the step 405 may indicate that the connection establishment is not possible and/or that the wireless communication portion 132 is not connectable and, instead of transmitting the ADV_DIRECT_IND event(s) in step 406 the wireless communication portion 132 may continue transmitting the ADV_SCAN_IND events to indicate operation in the discoverable state.

Once the wireless communication portion 112 receives at least some of the ADV_DIRECT_IND events, it may initiate connection setup with the wireless communication portion 132 using procedures known in the art, and the process may continue with the information exchange between the first device 110 and the second device 130 via the wireless connection established between the wireless communication portions 112 and 132.

Regardless of the type of the connectable state of the wireless communication portion 132, e.g. connectable by the scanning device 110 hosting the wireless communication portion 112 or connectable by all scanning devices, the wireless communication portion 132 may be configured to operate in the connectable mode for example for a predetermined period of time, until completion of the information exchange following the connection setup, until a subsequent connection attempt by another scanning device, etc.

While in the foregoing the BT LT events were used as examples of indicators of the operating state of the wireless communication portion 132, a different communication protocol and/or a different mechanism for indicating the operating state of the wireless communication portion 132 may be applied.

Each of the wireless communication portion 112 and 132 may be described as an entity or an apparatus comprising means for carrying out the operations, procedures, functions and/or methods described hereinbefore in context of the wireless communication portions 112, 132 and/or in context of the devices 110, 130, respectively, hosting these communication portions. Such means may be provided as software means, as hardware means, or as a combination of software means and hardware means. As an example in this regard, the wireless communication portion 132 may be provided as an apparatus comprising means for operating the wireless communication portion 132 in one of a plurality of states, said plurality of states comprising at least a discoverable state wherein the wireless communication portion 132 is discoverable but not connectable and a connectable state wherein the wireless communication portion 132 is both discoverable and connectable, means for receiving, when operating the wireless communication portion 132 in the discoverable state, one or more requests from a remote wireless communication apparatus, and means for changing from the discoverable state to the connectable state in response to said requests fulfilling predefined criteria. As described hereinbefore in detail, such criteria may comprise, for example, one or more of the RSSI-based criteria and the identity/address-based criteria.

Figure 5:
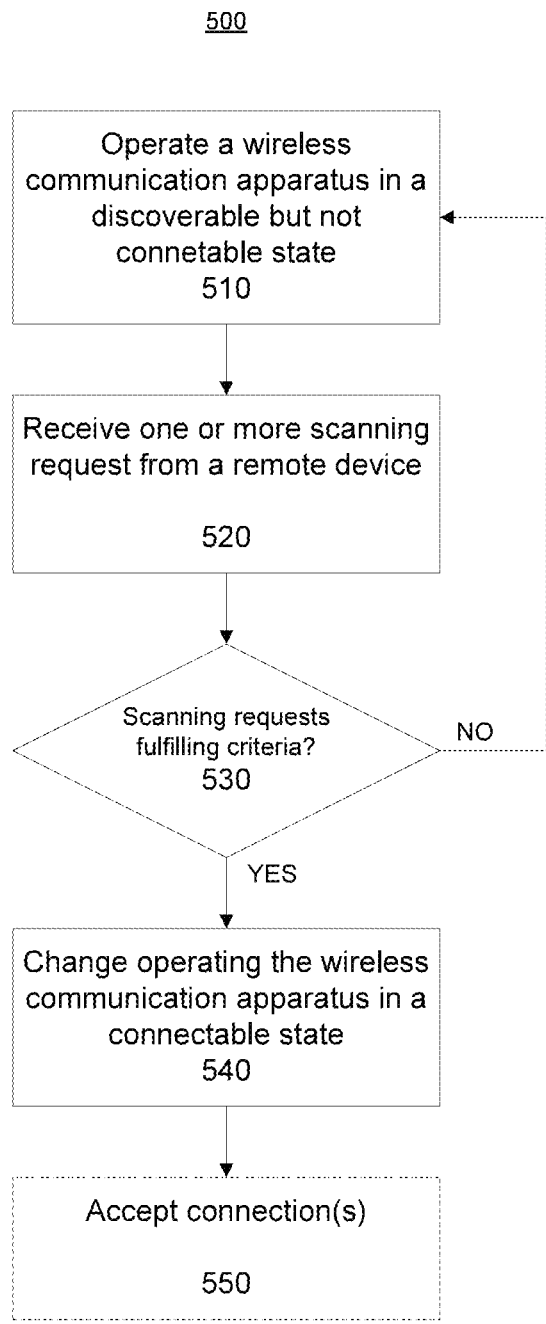
FIG. 5 illustrates a method according to an example embodiment.

The operations, procedures and/or functions assigned to the wireless communication portions 112, 132 and/or in context of the devices 110, 130, respectively, hosting these communication portions may be provided as steps of a method. As an example of this regard, FIG. 5 illustrates a method 500. The method 500 serves as a method for facilitating connection establishment between the wireless communication portions 112, 132. The method 500 may be provided, for example, in the wireless communication portion 132 or jointly by the wireless communication portion 132 and one or more other portions or entities of the second device 130 hosting the wireless communication portion 132.

The method 500 comprises operating the wireless communication portion 132 in the discoverable state, as indicated in block 510. The method 500 further comprises receiving one or more scan requests from a remote wireless communication portion, e.g. the wireless communication portion 112, as indicated in block 520. The method 500 further comprises evaluating whether the scan requests meet the predetermined criteria, as indicated in block 530. As described hereinbefore, meeting the criteria may comprise RSSI value(s) extracted from or derived on basis of the scan requests exceeding a predefined threshold, the identity indicated for the remote device in the scan requests matching one of the predetermined identities/addresses or both. In case the criteria are not met, the method 500 continues from block 510. In case the criteria are met, the method 500 proceeds to changing the wireless communication portion 132 to operate in the connectable state, as indicated in block 540. Depending on the applied mode of operation, as described hereinbefore, the connectable state may allow connections from the wireless communication portion 112 (or the scanning device 110) that sent the scan request(s) or the connectable state may allow connections from all scanning devices. Consequently, the wireless communication portion 132 is operated in a state where it accepts connections, as indicated in block 550.

Figure 6:
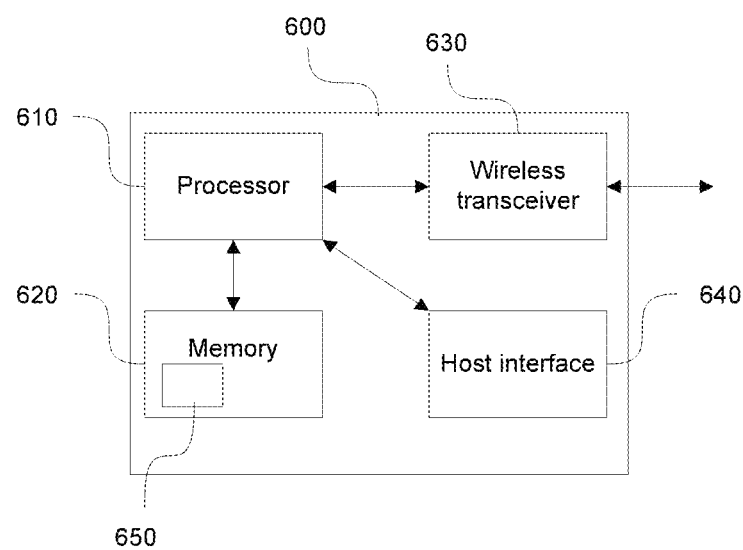
FIG. 6 schematically illustrates some components of an exemplifying apparatus in accordance with an example embodiment.

FIG. 6 schematically illustrates some components of an exemplifying apparatus 600 upon which an embodiment of the invention may be implemented. The apparatus 600 provides a diagram of exemplary components of an apparatus, which is capable of operating as or providing the wireless communication portion 132 according to an example embodiment. The apparatus 600 comprises a processor 610 and a memory 620. The processor 610 is configured to read from and write to the memory 620. The apparatus 600 further comprises a wireless transceiver 630 for communication with remote wireless transceivers of a corresponding type. The wireless transceiver 630 may apply e.g. the BT LE protocol described hereinbefore as an exemplifying framework for embodying the present invention. The apparatus 600 may further comprise a host interface 640 for providing an interface to other components or entities hosting the apparatus 600, e.g. the advertising device 130. The apparatus 600 may comprise further components not illustrated in the example of FIG. 6.

Although the processor 610 is depicted as a single component, the processor 610 may be implemented as one or more separate components. Similarly, although the memory 620 is illustrated as a single component, the memory 620 may be implemented as one or more separate components, some or all of which may be integrated/removable and/or may provide permanent/semi-permanent/dynamic/cached storage.

The memory 620 may store a computer program 650 comprising computer-executable instructions that control the operation of the apparatus 600 when loaded into the processor 610. As an example, the computer program 650 may include one or more sequences of one or more instructions. The computer program 650 may be provided as a computer program code. The processor 610 is able to load and execute the computer program 650 by reading the one or more sequences of one or more instructions included therein from the memory 620. The one or more sequences of one or more instructions may be configured to, when executed by one or more processors, cause an apparatus, for example the apparatus 600, to carry out operations, procedures and/or functions described hereinbefore in context of the wireless communication portion 132 and/or in context of the advertising device 130.

Hence, the apparatus 600 may comprise at least one processor 610 and at least one memory 620 including computer program code for one or more programs, the at least one memory 620 and the computer program code configured to, with the at least one processor 610, cause the apparatus 600 to perform operations, procedures and/or functions described hereinbefore in context of the wireless communication portion 132 and/or in context of the advertising device 130.

The computer program 650 may be provided at the apparatus 600 via any suitable delivery mechanism. As an example, the delivery mechanism may comprise at least one computer readable non-transitory medium having program code stored thereon, the program code which when executed by the apparatus 600 cause the apparatus 600 at least to carry out operations, procedures and/or functions described hereinbefore in context of the wireless communication portion 132 and/or in context of the advertising device 130. The delivery mechanism may be for example a computer readable storage medium, a computer program product, a memory device a record medium such as a CD-ROM, a DVD, a Blue-Ray disc or another article of manufacture that tangibly embodies the computer program 650. As a further example, the delivery mechanism may be a signal configured to reliably transfer the computer program 650.

Thus, the computer program 650 may be provided e.g. as a computer program product comprising at least one computer-readable non-transitory medium having program code stored thereon, the program code, when executed by an apparatus, e.g. the apparatus 600, causing the apparatus at least to perform operations, procedures and/or functions described hereinbefore in context of the wireless communication portion 132 and/or in context of the advertising device 130. As an example in this regard, the program code may be arranged to cause the apparatus to operate in one of a plurality of states, said plurality of states comprising at least the discoverable and the connectable state described hereinbefore, to receive, when being operated in the discoverable state, one or more requests from a remote wireless communication apparatus, and to change from the discoverable state to the connectable state in response to said requests fulfilling predefined criteria. As described hereinbefore in detail, such criteria may comprise, for example, one or more of the RSSI-based criteria and the identity/address-based criteria.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus comprising at least one processor and at least one memory including computer program code for one or more programs, the at least one memory and the computer program code configured to, with the at least one processor, cause a wireless communication apparatus at least to:
   operate in one of a plurality of states, said plurality of states comprising at least
      a discoverable state wherein the wireless communication apparatus is discoverable but not connectable, and
      a connectable state wherein the wireless communication apparatus is both discoverable and connectable;
   receive, when being operated in the discoverable state, one or more requests from a remote wireless communication apparatus; and
   change from the discoverable state to the connectable state in response to said requests fulfilling predefined criteria, wherein said predefined criteria comprises an identity or address associated with said remote wireless communication apparatus matching an allowable identity or address.

2. An apparatus according to claim 1, wherein said requests fulfilling said predefined criteria comprises a received signal strength indication derived on basis of said requests indicating the remote wireless communication apparatus to be within an operating range.

3. An apparatus according to claim 2, wherein the remote wireless communication device is considered to be within the operating range in response a received signal strength indication derived for at least a predetermined number of said requests exceeding a predetermined threshold.

4. An apparatus according to claim 2, wherein said connectable state comprises one of the following:
   a connectable state wherein the wireless communication apparatus is connectable by said remote wireless communication apparatus, and
   a connectable state wherein the wireless communication apparatus is connectable by any remote wireless communication apparatus that is configured to implement a short range wireless communication protocol that the wireless communication apparatus also is configured to implement.

5. An apparatus according to claim 1, wherein said connectable state comprises a connectable state wherein the wireless communication apparatus is connectable by said remote wireless communication apparatus.

6. An apparatus according to claim 1, wherein the wireless communication apparatus is caused to apply the Bluetooth Low Energy protocol and wherein the wireless communication apparatus is caused to transmit one or more indicators indicative of the state in which it is being operated, wherein
   an indicator indicative of the discoverable state comprises an ADV_SCAN_IND event,
   an indicator indicative of a connectable state wherein the wireless communication apparatus is connectable by said remote wireless communication apparatus comprises an ADV_DIRECT_IND event,
   an indicator indicative of a connectable state wherein the wireless communication apparatus is connectable by any remote wireless communication apparatus comprises an ADV_IND event.

7. A method comprising
   operating a wireless communication apparatus in one of a plurality of states, said plurality of states comprising at least
      a discoverable state wherein the wireless communication apparatus is discoverable but not connectable, and
      a connectable state wherein the wireless communication apparatus is both discoverable and connectable;
   receiving, when operating the wireless communication apparatus in the discoverable state, one or more requests from a remote wireless communication apparatus; and
   changing from the discoverable state to the connectable state in response to said requests fulfilling predefined criteria, wherein said predefined criteria comprises an identity or address associated with said remote wireless communication apparatus matching an allowable identity or address.

8. A method according to claim 7, wherein fulfilling said requests fulfilling said predefined criteria comprises a received signal strength indication derived on basis of said requests indicating the remote wireless communication apparatus to be within an operating range.

9. A method according to claim 8 wherein the remote wireless communication device is considered to be within the operating range in response a received signal strength indication derived for at least a predetermined number of said requests exceeding a predetermined threshold.

10. A method according to claim 8, wherein said connectable state comprises one of the following:
- a connectable state wherein the wireless communication apparatus is connectable by said remote wireless communication apparatus, and
- a connectable state wherein the wireless communication apparatus is connectable by any remote wireless communication apparatus that is configured to implement a short range wireless communication protocol that the wireless communication apparatus also is configured to implement.

11. A method according to claim 7, wherein said connectable state comprises a connectable state wherein the wireless communication apparatus is connectable by said remote wireless communication apparatus.

12. A method according to claim 7, wherein the wireless communication apparatus is configured to apply the Bluetooth Low Energy protocol, the method further comprising transmitting one or more indicators indicative of the state in which the wireless communication apparatus is being operated, wherein
- an indicator indicative of the discoverable state comprises an ADV_SCAN_IND event,
- an indicator indicative of a connectable state wherein the wireless communication apparatus is connectable by said remote wireless communication apparatus comprises an ADV_DIRECT_IND event,
- an indicator indicative of a connectable state wherein the wireless communication apparatus is connectable by any remote wireless communication apparatus comprises an ADV_IND event.

13. A computer program product comprising a non-transitory computer readable storage medium having computer executable program code recorded thereon, the computer executable program code comprising:
- code configured to cause a wireless communication apparatus to operate in one of a plurality of states, said plurality of states comprising at least
  - a discoverable state wherein the wireless communication apparatus is discoverable but not connectable, and
  - a connectable state wherein the wireless communication apparatus is both discoverable and connectable;
- code configured to cause the wireless communication apparatus to receive, when being operated in the discoverable state, one or more requests from a remote wireless communication apparatus; and
- code configured to cause the wireless communication apparatus to change from the discoverable state to the connectable state in response to said requests fulfilling predefined criteria, wherein said predefined criteria comprises an identity or address associated with said remote wireless communication apparatus matching an allowable identity or address.

14. A computer program product according to claim 13, wherein said requests fulfilling said predefined criteria comprises a received signal strength indication derived on basis of said requests indicating the remote wireless communication apparatus to be within an operating range.

15. A computer program product according to claim 14, wherein the remote wireless communication device is considered to be within the operating range in response a received signal strength indication derived for at least a predetermined number of said requests exceeding a predetermined threshold.

16. A computer program product according to claim 14, wherein said connectable state comprises one of the following:
- a connectable state wherein the wireless communication apparatus is connectable by said remote wireless communication apparatus, and
- a connectable state wherein the wireless communication apparatus is connectable by any remote wireless communication apparatus that is configured to implement a short range wireless communication protocol that the wireless communication apparatus also is configured to implement.

17. A computer program product according to claim 13, wherein said connectable state comprises a connectable state wherein the wireless communication apparatus is connectable by said remote wireless communication apparatus.

18. A computer program product according to claim 13, wherein the wireless communication apparatus is caused to apply the Bluetooth Low Energy protocol and wherein the wireless communication apparatus is caused to transmit one or more indicators indicative of the state in which it is being operated, wherein
- an indicator indicative of the discoverable state comprises an ADV_SCAN_IND event,
- an indicator indicative of a connectable state wherein the wireless communication apparatus is connectable by said remote wireless communication apparatus comprises an ADV_ DIRECT_IND event,
- an indicator indicative of a connectable state wherein the wireless communication apparatus is connectable by any remote wireless communication apparatus comprises an ADV_IND event.

\* \* \* \* \*